United States Patent
Schultz et al.

(10) Patent No.: US 9,881,163 B2
(45) Date of Patent: Jan. 30, 2018

(54) SYSTEM AND METHOD FOR PERFORMING SENSITIVE GEO-SPATIAL PROCESSING IN NON-SENSITIVE OPERATOR ENVIRONMENTS

(71) Applicant: Pictometry International Corp., Rochester, NY (US)

(72) Inventors: Stephen L. Schultz, West Henrietta, NY (US); Frank Giuffrida, Honeoye Falls, NY (US)

(73) Assignee: Pictometry International Corp., Rochester, NY (US)

( * ) Notice: Subject to any disclaimer, the term of this patent is extended or adjusted under 35 U.S.C. 154(b) by 186 days.

(21) Appl. No.: 13/796,839

(22) Filed: Mar. 12, 2013

(65) Prior Publication Data

US 2014/0283086 A1    Sep. 18, 2014

(51) Int. Cl.
*G06F 21/60* (2013.01)
*G06F 17/30* (2006.01)
(Continued)

(52) U.S. Cl.
CPC .............. *G06F 21/60* (2013.01); *G01C 11/00* (2013.01); *G06F 17/30241* (2013.01); *H04L 63/0407* (2013.01); *H04W 12/02* (2013.01)

(58) Field of Classification Search
CPC ......... G06F 17/30241; G06F 17/30041; G06F 17/30047; G06F 21/60; G01C 11/00; H04L 63/0407; H04W 12/02
See application file for complete search history.

(56) References Cited

U.S. PATENT DOCUMENTS

| 2,273,876 A | 2/1942 | Lutz et al. |
| 3,153,784 A | 10/1964 | Petrides et al. |

(Continued)

FOREIGN PATENT DOCUMENTS

| AT | 331204 T | 7/2006 |
| BR | 0316110 | 9/2005 |

(Continued)

OTHER PUBLICATIONS

Korean Intellectual Property Office, International Search Report and Written Opinion, dated Jul. 25, 2014.
(Continued)

*Primary Examiner* — Xiao Wu
*Assistant Examiner* — Chong Wu
(74) *Attorney, Agent, or Firm* — Dunlap Codding, P.C.

(57) ABSTRACT

Methods and systems are disclosed including transmitting, by processor of a server computer, image raster content of a geo-referenced aerial image to an operator user device without the geo-referencing information of the geo-referenced aerial image; receiving, by the processor of the server computer from the operator user device, image coordinates, which may be in the form of pixel row/column, representing an object or region of interest selected within the image raster content of the geo-referenced aerial image by a data processing operator of the operator user device; and translating the image coordinates into real-world geographic coordinates. The processor may calculate measurements based on the real-world geographic coordinates and may store real-world geographic coordinates and/or measurements. The geo-referenced aerial image may be isolated such that a data processing operator may not be able to pan or zoom outside of the isolated geo-referenced aerial image.

24 Claims, 13 Drawing Sheets

(51) Int. Cl.
*H04L 29/06* (2006.01)
*H04W 12/02* (2009.01)
*G01C 11/00* (2006.01)

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Gerald |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | McLaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 5/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 10/2000 | Szeliski et al. |
| 6,167,300 A | 10/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 * | 10/2004 | Loveland ............... 705/7.13 |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,054,741 B2 | 5/2006 | Harrison et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,233,691 B2 | 6/2007 | Setterholm |
| 7,262,790 B2 | 8/2007 | Bakewell |
| 7,348,895 B2 | 3/2008 | Lagassey |
| 7,424,133 B2 | 9/2008 | Schultz et al. |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0214585 A1 | 11/2003 | Bakewell |
| 2004/0105090 A1 * | 6/2004 | Schultz et al. ............ 356/141.5 |
| 2004/0167709 A1 | 8/2004 | Smitherman et al. |
| 2005/0034074 A1 | 2/2005 | Munson et al. |
| 2005/0052685 A1 * | 3/2005 | Herf et al. ............... 358/1.15 |
| 2005/0073241 A1 | 4/2005 | Yamauchi et al. |
| 2005/0073532 A1 | 4/2005 | Scott et al. |
| 2005/0088251 A1 | 4/2005 | Matsumoto |
| 2005/0169521 A1 | 8/2005 | Hel-Or |
| 2006/0028550 A1 | 2/2006 | Palmer et al. |

(56) References Cited

U.S. PATENT DOCUMENTS

| | | | |
|---|---|---|---|
| 2006/0092043 | A1 | 5/2006 | Lagassey |
| 2006/0170693 | A1* | 8/2006 | Bethune et al. ............ 345/568 |
| 2006/0238383 | A1 | 10/2006 | Kimchi et al. |
| 2006/0250515 | A1 | 11/2006 | Koseki et al. |
| 2007/0024612 | A1 | 2/2007 | Balfour |
| 2007/0046448 | A1 | 3/2007 | Smitherman |
| 2007/0237420 | A1 | 10/2007 | Steedly et al. |
| 2008/0120031 | A1 | 5/2008 | Rosenfeld et al. |
| 2008/0123994 | A1 | 5/2008 | Schultz et al. |
| 2008/0301727 | A1* | 12/2008 | Cristofalo et al. ............ 725/35 |
| 2009/0177458 | A1 | 7/2009 | Hochart et al. |
| 2009/0208095 | A1 | 8/2009 | Zebedin |
| 2009/0304227 | A1 | 12/2009 | Kennedy et al. |
| 2010/0296693 | A1 | 11/2010 | Thornberry et al. |
| 2011/0033110 | A1 | 2/2011 | Shimamura et al. |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 12/2004 |
| EP | 1696204 | 8/2006 |
| ES | 2266704 T | 3/2007 |
| JP | 2003/317089 A | 11/2003 |
| JP | 2012-194494 A | 10/2012 |
| KR | 10-0484941 B1 | 4/2005 |
| MX | PA05004987 | 2/2006 |
| WO | WO99/18732 | 4/1999 |
| WO | WO/2000/053090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ackermann, Prospects of Kinematic GPS Aerial Triangulation, ITC Journal, 1992.

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267 &coll=GUIDE&dl=, 1999.

Slaymaker, et al., "A System for Real-time Generation of Georeferenced Terrain Models", 4232A-08, *SPIE Enabling Technologies for Law Enforcement* Boston, MA, ftp://vis-ftp.cs.umass.edu/Papers/schultz/spie2000.pdf, 2000.

Slaymaker, et al., "Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

(56) References Cited

OTHER PUBLICATIONS

"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", Microimages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. 12 Dec. 2000.
Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navtgation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure,Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung und Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 200I.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. In 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Pictometry International Corp., "Pictometry Online" Brochure, Oct. 2010.

(56) References Cited

OTHER PUBLICATIONS

European Patent Office, Extended European Search Report (including the supplementary European Search Report and European Search Opinion) regarding application No. 14779758.3 filed from PCT/US2014024774; Oct. 14, 2016.
Stahl et al., "Taking Location Modelling to New Levels: A Map Modelling Toolkit for Intelligent Environments," Jan. 1, 2006; Location-and-Context-Awareness Lecture Notes in Computer Science;;LNCS, Springer, Berlin, DE, pp. 74-85, XP019032563, ISBN: 978-3-540-34150-5.

* cited by examiner

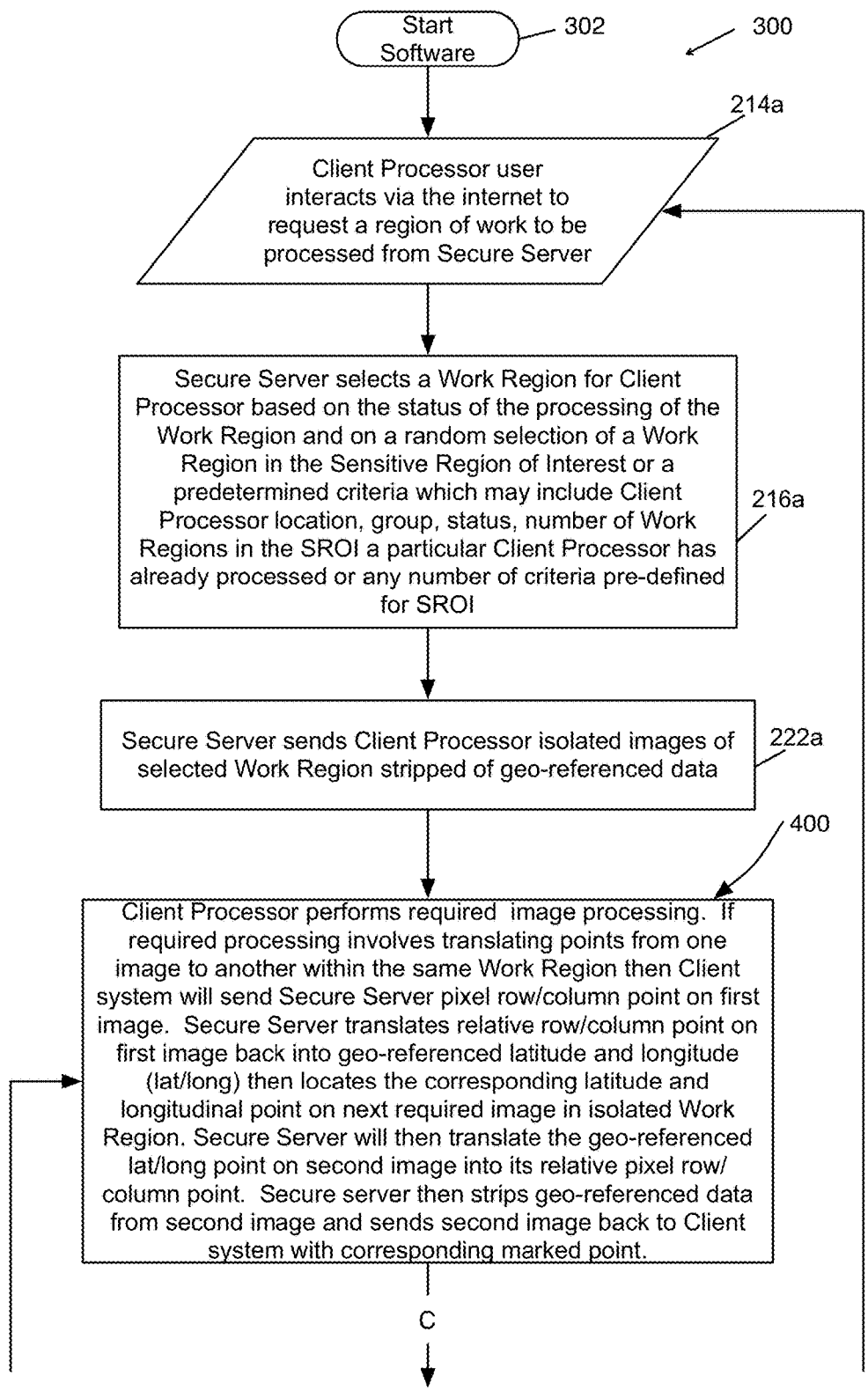

SYSTEM AND METHOD FOR PERFORMING SENSITIVE GEO-SPATIAL PROCESSING IN NON-SENSITIVE OPERATOR ENVIRONMENTS

FIELD OF THE DISCLOSURE

The disclosure generally relates to methods and systems for performing sensitive geo-spatial processing in non-sensitive operator environments. More particularly the disclosure relates to transmitting aerial imagery for data processing in non-secure environments. The data processing may be done using unique pixels and/or pixel row location and pixel column location. The results of the data processing may be received and translated into real-world geographic coordinates in a secure environment.

BACKGROUND

In remote sensing/aerial imaging industry, imagery may be used to capture views of a geographic area in order to identify and measure objects and/or structures within the images as well as to be able to determine geographic locations of points within the image. These are generally referred to as "geo-referenced images" and come in two basic categories:

Vertical Imagery, also known as Nadir Imagery—images captured with a camera pointed vertically downward thus generally capturing the tops of structures; and, Oblique Imagery—images captured with a camera aimed at an angle capturing the sides, as well as, tops of structures.

Geo-referenced imagery may contain information regarding geographic location of the area depicted in the imagery. The information may be in the form of real-world geographic coordinates for points and/or pixels in the imagery. The geographic information may allow data processing operators to take measurements, such as distances and dimensions of objects and elements in the imagery, by choosing points and/or pixels in the imagery. Aerial imagery may also be used to identify and locate buildings, man-made structures, and natural elements such as hills, valleys, rivers, lakes, land contours, and terrain. For example, government entities may want to identify structures, or natural elements within a region. Power companies may want to measure line sag of electrical lines or determine encroaching man-made or natural structures. Assessors may want to measure building dimensions and generally rely on building dimensions to assess a value to that building.

Currently, systems exist that are able to take a geographic location, search through a database of oblique and vertical images, find the image that contains the desired location, and display that image to the data processing operator. Systems may allow the data processing operator to take measurements on the image, obtain the geographic location of points in the image, search by geographic location, and pan and scroll through the large areas of coverage contained in the geospatial database. One such system is Pictometry Connect—an oblique image based geospatial engine that embodies many of the features described above and described in U.S. Pat. No. 7,424,133, issued Sep. 9, 2008. However, all of these capabilities present issues when trying to process data from aerial imagery and yet protect geospatially sensitive information.

Many governments and companies have the need to process sensitive geospatial data. For instance, creating high accuracy ortho-mosaics or 3D models of military bases or mapping equipment infrastructure along utility corridors. In these cases, there are homeland security issues with foreign nationals or individuals without proper security clearance knowing the precise geographic location of these critical assets. For these security reasons, it is generally forbidden to do geospatial processing outside of a federal government entity, even though outside processing labor rates may be a fraction of the cost of processing within the federal government entity. What is needed is a solution that allows geospatial processing in non-sensitive operator environments while protecting sensitive geographic data.

SUMMARY

Methods and systems are disclosed. The problem of protecting sensitive geographic data during data processing is addressed through transmitting image raster content of geo-referenced aerial imagery without the real-world geographic coordinate information to an operator user device for data processing, receiving data processing information utilizing image coordinates within the image raster content from the operator user device, and translating the data processing information from relative image coordinates within the image raster content into a real-world geographic coordinate system and performing any requested calculations, measurements, and/or data processing based on the data processing information in the real-world coordinate system.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 3A-3B show a process flow diagram of steps of an exemplary method for data processing of a sensitive geographic region of interest in accordance with the present disclosure.

DETAILED DESCRIPTION

Figure 1:
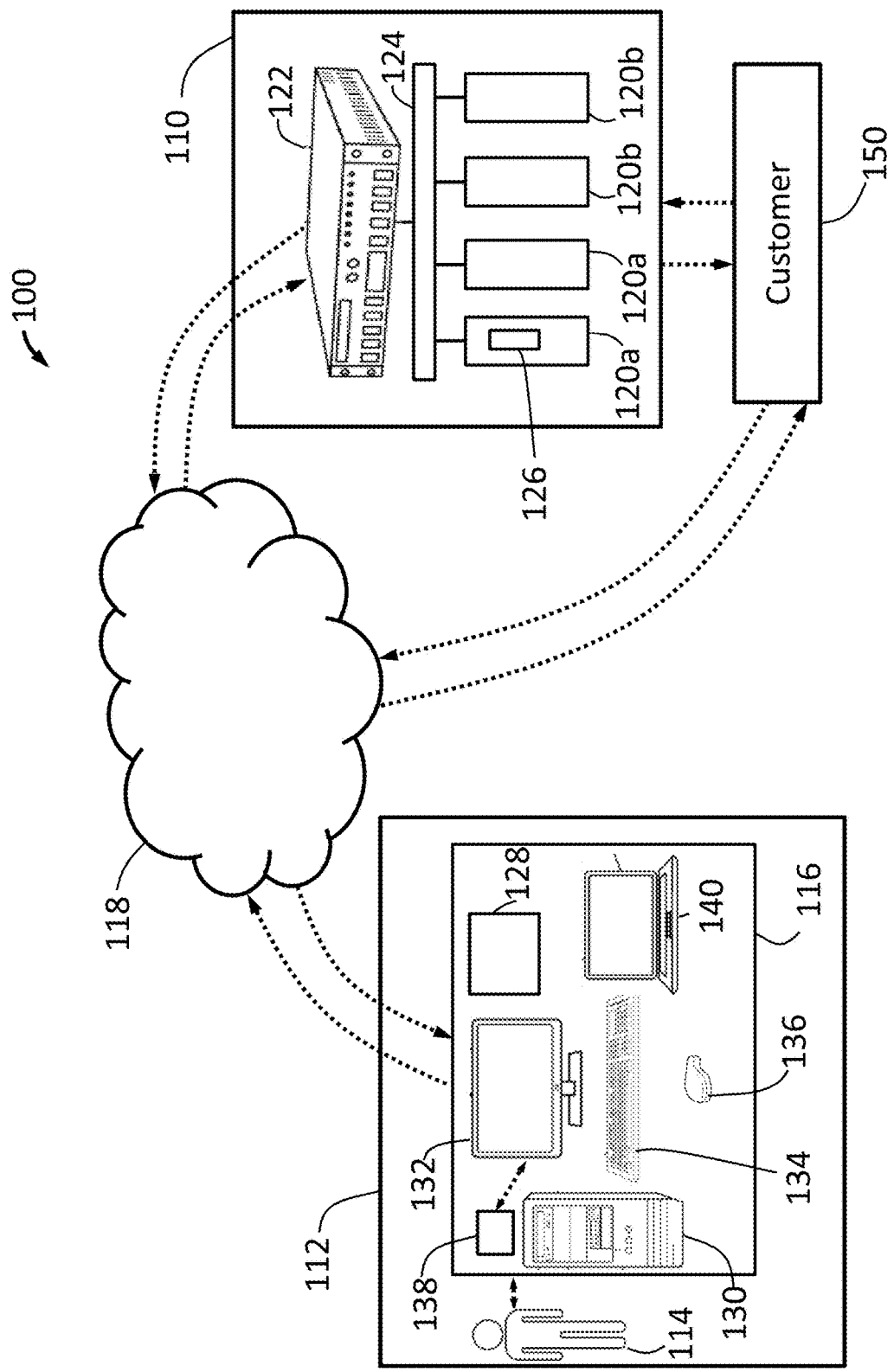
FIG. 1 is a block diagram of an exemplary computer system constructed in accordance with the present disclosure.

The following detailed description refers to the accompanying drawings. The same reference numbers in different drawings may identify the same or similar elements.

The mechanisms proposed in this disclosure circumvent the problems described above. The present disclosure describes a method and system for performing sensitive geo-spatial processing in non-sensitive operator environments.

In one embodiment, a method comprises the steps of transmitting, by a processor of a secure server computer, image raster content of a geo-referenced aerial image to an operator user device without transmitting geo-referencing information of the geo-referenced aerial image; receiving, by the processor of the secure server computer from the operator user device, at least one image coordinate representing an object or region of interest selected within the image raster content by a data processing operator of the operator user device; and translating, by the processor of the secure server computer, the image coordinate into a real-world geographic coordinate representing the object or region of interest using the geo-referencing information of the geo-referenced aerial image. In one embodiment, at least one image coordinate within the image raster content are received and translated into real-world coordinates. The processor of the secure server computer may store the real-world coordinates on a non-transitory computer readable medium. The processor may store a series of related points that form a path or polygon. The processor of the secure server computer may calculate a measurement, such as distance, length, width, height, area, surface area of a vertical surface, surface area of a pitches surface, slope in elevation, or volume, based on two, three, four or more real-world geographic coordinates and may store the measurement on a non-transitory computer readable medium. In one embodiment, the measurement and the real-world geographic coordinates are not transmitted to the operator user device. The image coordinates may be pixel row and column information. The aerial image may be isolated such that a data processing operator may not be able to use the operator user device to pan or zoom outside of the isolated aerial image and/or Work Region.

In one embodiment, upon receipt of the image coordinates and translation into real-world geographic coordinates, the processor of the secure server computer may retrieve a second aerial image, showing objects within the first and second aerial images from a different perspective, convert the real-world geographic coordinates into image coordinates relative to the second aerial image and cause a marker to appear on the second aerial image coinciding with those image coordinates, thus never sending real-world geographic coordinates to the operator user device. The marker can be applied by modifying image raster content of the second aerial image, or by applying a layer containing the marker over the second aerial image. The processor of the server computer may then remove the real-world geographic coordinates, and transmit the second aerial image to the operator user device in order to permit the data processing operator to continue data processing on the operator user device with the first and/or second aerial images.

In one embodiment, the inventive concepts may be in the form of a set of instructions stored on at least one non-transient computer readable medium for running on a computer system.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based.

Referring now to the drawings, and in particular to FIG. 1, shown therein and designated by a reference numeral 100 is an exemplary computer system constructed in accordance with the present disclosure. The computer system 100 can be a system or systems that are able to embody and/or execute the logic of the processes described herein. The logic embodied in the form of software instructions or firmware may be executed on any appropriate hardware which may be a dedicated system or systems, or a personal computer system, or distributed processing computer system. In particular, the logic can be implemented in a stand-alone environment operating on a single computer system, or the logic can be implemented in a networked environment such as a distributed system using multiple computers and/or processors.

For example, the computer system 100 may be distributed, and may include a controlled datacenter 110 acting as a host system, communicating with one or more Data Processing Entity 112 and/or Data Processing Operator 114 utilizing one or more operator user device(s) 116 via a network 118. The network 118 can be the Internet or other network. The controlled datacenter 110 may include one or more secure servers 120 (which will be referred to hereinafter as the secure server 120) configured to communicate with the network 118 via one or more gateways 122. If the network 118 is the Internet, then the primary user interface of the computer system 100 for operator user devices 116 may be delivered through a series of web pages. The primary user interface may be another type of interface, such as a Windows-based application. This method may also be used when deploying the computer system 100 in a stand-alone environment.

The network 118 can be almost any type of network such as Internet and Internet 2 networks. If the network 118 exists in an Internet environment, network 118 may be TCP/IPbased. It is conceivable that in the near future, more advanced networking topologies may be used.

The secure server 120 can be networked with a LAN 124. The gateway 122 is an entity responsible for providing access between the LAN 124 and the network 118. The gateway 122 can also be used as a security means to protect the LAN 124 from attack through external networks such as the network 118. The LAN 124 and the one or more secure servers 120 may be secured from unauthorized access physically and/or logically. The one or more secure servers 120 may be referred to herein simply as secure server 120, for ease of reference.

The LAN 124 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one embodiment, the controlled datacenter 110 includes the one or more secure servers 120 (which will be referred to hereinafter as the secure server 120). The configuration of the server hardware will depend greatly upon the requirements and needs of the particular embodiment of the computer system 100. The secure servers 120 include one or more secure server processors 126 (which will be referred to hereinafter as the secure server processor 126). Typical embodiments will include multiple servers 120 with load balancing to increase stability and availability. It is envisioned that the secure servers 120 will include database servers 120a and application/web servers 120b. The database servers 120a may be separated from the application/web servers 120b to improve availability and also to provide the database servers 120a with improved hardware and storage and/or security. Of course, the controlled datacenter 110 may contain one or more other processors. Functions described herein as carried out by the secure server processor(s) 126 or operator user device(s) 116 may be carried out by one or more other processors in the controlled datacenter 110 or the computer system 100.

The operator user device 116 utilized by the Data Processing Entity/Operator 112/114 can be any number and type of devices. The operator user device 116 typically includes one or more user device processor 128 (which will be referred to hereinafter as the user device processor 128). The most typical scenario of the operator user device 116 involves the data processing operator 114, using a computer 130 with a display 132, keyboard 134, and mouse 136. The operator user device 116 may include the user device processor 128. The display 132 can be a single monitor or multiple adjacent monitors. Typically, the operator user device 116 uses a type of software called a "browser" as indicated by a reference numeral 138 to render HTML/XHTML content that is generated when requesting resources from a source, such as the controlled datacenter 110. In one embodiment, the computer system 100 is designed to be compatible with major Web Browser vendors (e.g., Microsoft Internet Explorer, Google Chrome, Mozilla Firefox, and Opera). Other embodiments may wish to focus on one particular browser depending upon the common user base using the computer system 100.

The operator user device 116 can also be implemented as a portable device such as a laptop computer 140 (or handheld computer) or a pen-based or tablet computer. In one embodiment, the operator user device 116 can be a "dumb" device with the display 132 and keyboard 134 with at least a portion of computer processing taking place elsewhere. Current embodiments of computer system 100 can also be modified to use any of these or future developed devices.

One or more customer 150 may communicate with the controlled datacenter 110 directly and/or via the network 118. The one or more customer 150 may request and receive data processing of sensitive geographic regions of interest.

The computer system 100 is designed in this way as to provide flexibility in its deployment. Depending upon the requirements of the particular embodiment, the system logic could be designed to work in almost any environment such as a desktop application, a web application, or even simply as a series of web services.

The hardware and software of the computer system 100 may be designed for flexibility, scalability, and security. Although some specifics for software and hardware components may be mentioned herein, it will be understood that a wide array of different components could be substituted, such as using different database vendors or even replacing the databases with XML-based document stores.

When the computer system 100 is used to execute the logic of the processes described herein, such computer(s) and/or execution can be conducted at a same geographic location or multiple different geographic locations. Furthermore, the execution of the logic can be conducted continuously or at multiple discrete times.

In general, the computer system 100 is capable of displaying and processing geo-referenced imagery, such as aerial imagery to measure within the imagery and/or identify objects within the imagery. The computer system 100 will be described by way of example utilizing aerial images shown on the display 132 of the computer 130. However, it should be understood that the computer system 100 can use other types of images, such as architectural images.

Figure 2A:
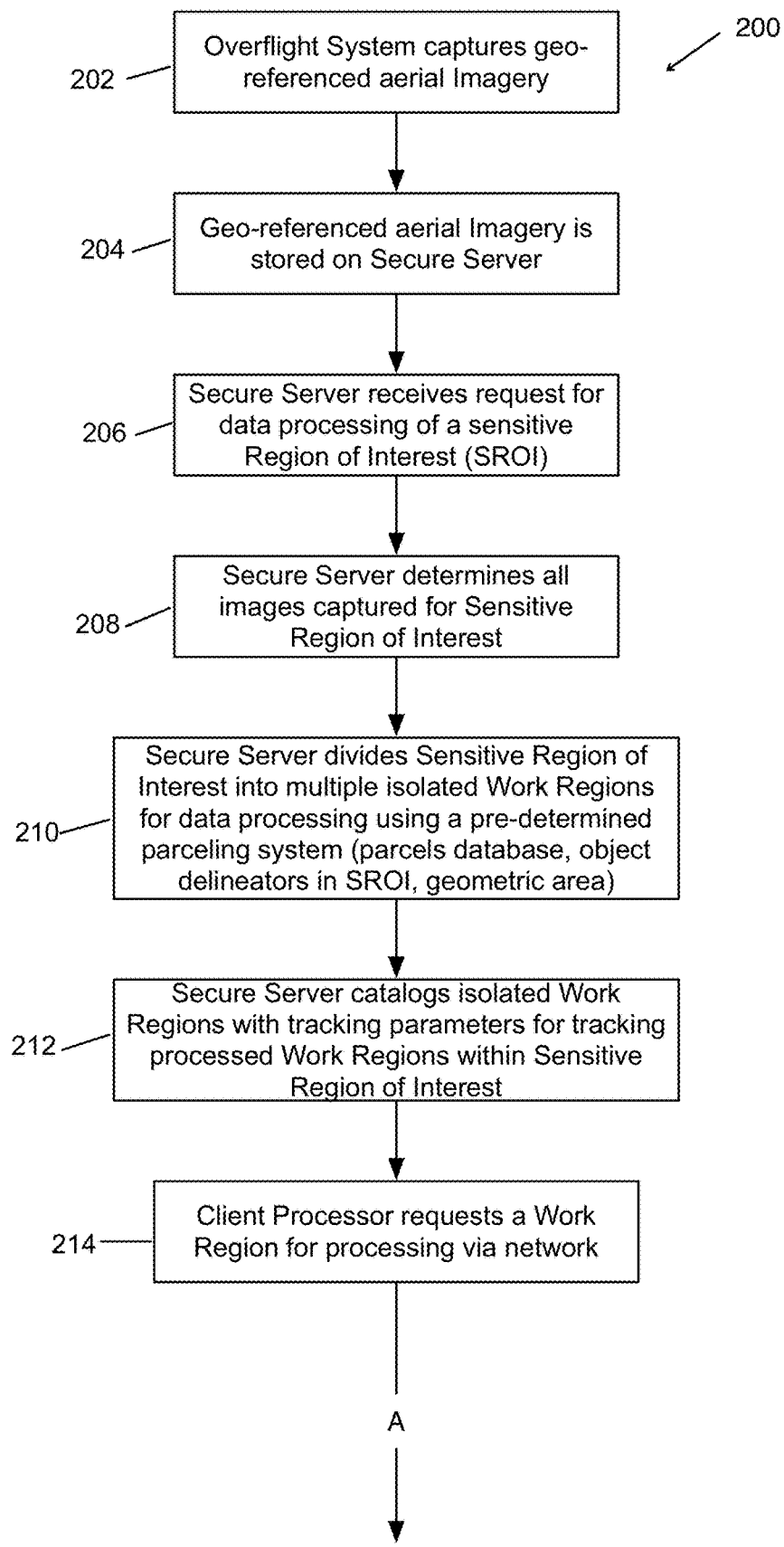
FIGS. 2A-2C show a process flow diagram of steps of an exemplary method for receiving and processing requests for data processing of a sensitive geographic region of interest in accordance with the present disclosure.
Figure 2B:
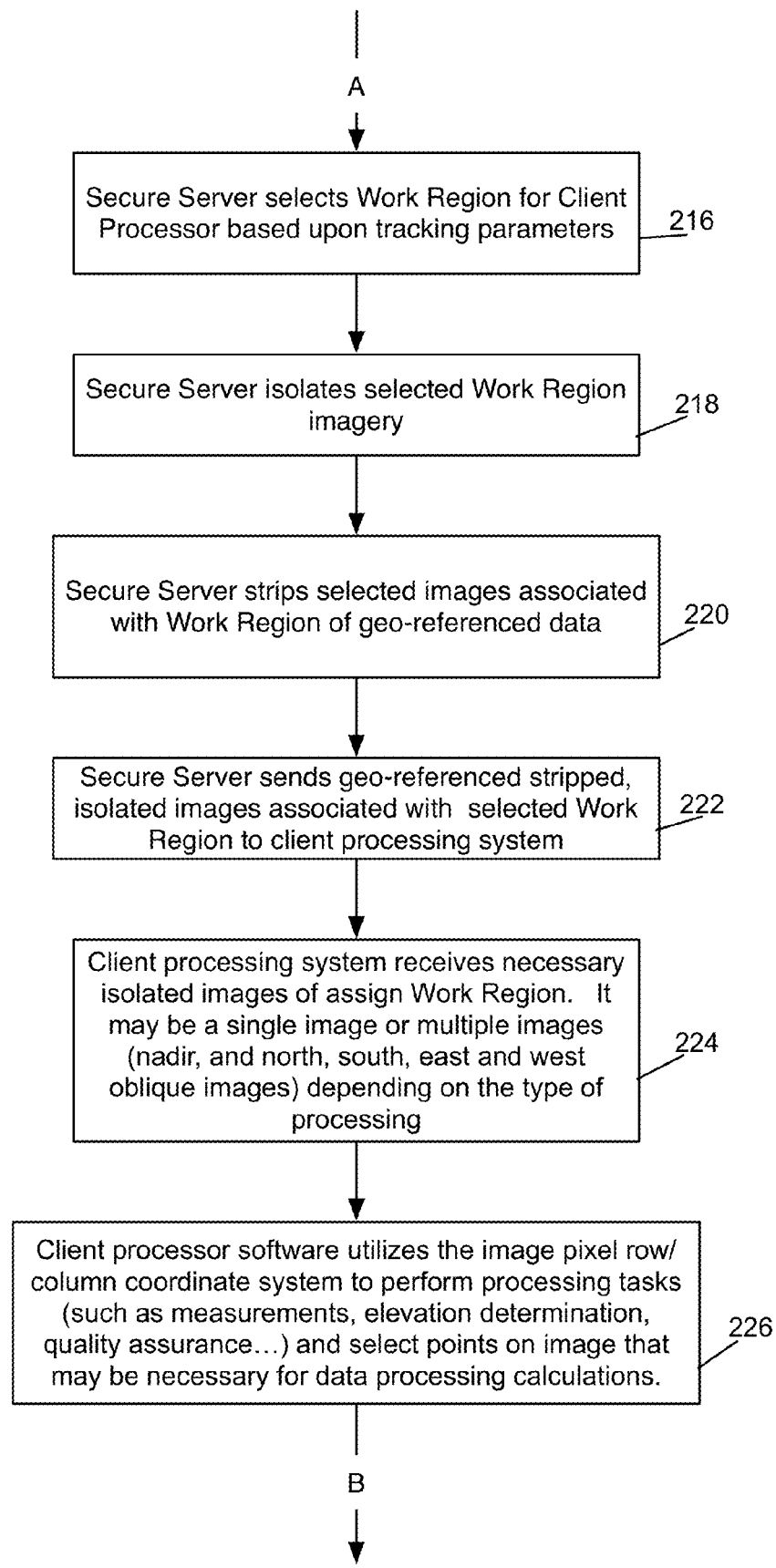
Figure 2C:
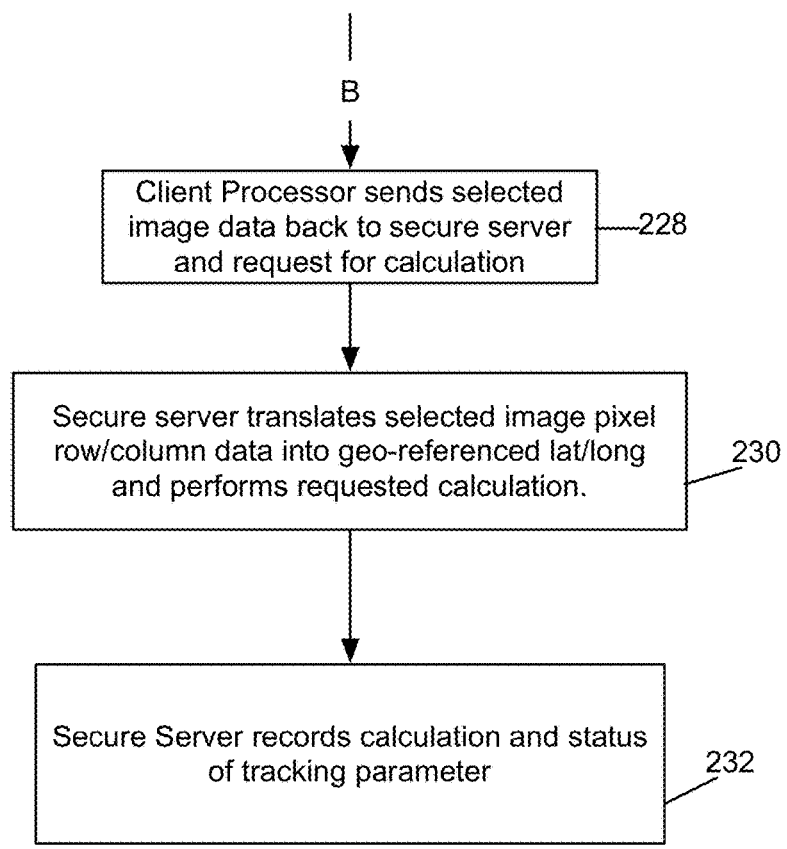

FIGS. 2A-2C depict a process flow diagram of steps of an exemplary method 200 for receiving and processing requests for data processing of a sensitive geographic region of interest in accordance with the present disclosure. In general, the method may include transmitting an aerial image for data processing to the data processing entity/operator 112/114, receiving data processing information utilizing image coordinates from the data processing entity/operator 112/114, translating the data processing information image coordinates into real-world geographic coordinates/geo-referenced data, and performing requested calculation(s) by the secure server processor 126. Further, the method may include removing information indicative of geographic location from the aerial image before transmittal to the data processing entity/operator 112/114.

More specifically, the geo-referenced aerial image contains information indicative of geographic location of the geographic area depicted in the aerial image. One or more points in the aerial image may be associated with a real-world geographic coordinate system, such as latitude, longitude, and elevation coordinates. The aerial image may have individual pixels that make up the aerial image. Each pixel in the aerial image may be assigned a real-world geographic location, such that the one or more processor, for example, the secure server processor 126 in the controlled datacenter 110, may retrieve or calculate the geographic location of a selected pixel in the image. The geo-referenced pixels may defect, for example, elevated structures above ground level, ground curvatures, and below the ground structures, such as ditches or holes.

The geo-referenced aerial images may be used for measurements and analysis while preventing the data processing entity/operator 112/114 from ascertaining the real-world geographic coordinates of the geo-referenced aerial images.

For example, the data processing entity/operator 112/114 may select points on the aerial image and the secure server processor 126 may retrieve or calculate the geographic location of the points with the geographic coordinate system, as well as calculate measurements within the image by using the point locations. Ground plane data (geographic coordinates and other ground plane information) and camera information, such as position and orientation system (POS) information, may be stored with the aerial image at the controlled data center 110, but such ground plane data and camera information is not transmitted to the data processing entity/operator 112/114. For example, the data and information may be stored in metadata with the aerial image, such as in grid format with a tessellated ground plane as described in U.S. patent application Ser. No. 10/701,839, now issued as U.S. Pat. No. 7,424,133, which is hereby incorporated by reference in its entirety, and which also describes geo-referencing and analysis of aerial images. In one embodiment, the metadata may be removed by the secure server processor 126 to remove the geo-referenced aerial image information indicative of geographic location prior to transmitting the aerial image to the data processing entity/operator 112/114.

As shown in step 202 of FIG. 2A, the geo-referenced aerial images may be captured by an aerial over-flight system. Of course, any geo-reference images captured in any manner may be used, for example, geo-referenced images captured from satellites or from automobiles or by individuals. The geo-referenced aerial images may be stored in non-transient memory on the secure server processor 126, as shown in step 204. The geo-referenced aerial images may be stored in a secure location and protected from unauthorized access through any suitable security measures, as known in the art. Some examples of security measures include, but are not limited to, firewalls, encryption, utilizing a stand-alone portion of the system, physical and logical limitations to access, etc.

The geo-referenced aerial image may be associated with a unique image identifier. One example of an image identifier may be identification number(s) and/or characters. Other non-exclusive examples of an image identifier include a location specific label or a customer specified identifier.

In step 206, the secure server processor 126 in the controlled datacenter 110 may receive a request for data processing of a sensitive geographic region of interest from the customer 150. Data processing may include quantitative and/or qualitative analysis. Non-exclusive examples of data processing include measuring objects and/or landscape features in the image, measuring distances between objects and/or landscape features, counting objects in a region, outlining footprints of buildings/structures, outlining land parcels, identifying objects encroaching on the right of way along a utility corridor, etc.

A sensitive geographic region of interest may be any geographic area determined by the customer 150 to be of a sensitive nature. For example, government regulations may prohibit the release of data regarding certain geographic sites to unclassified personnel, such as the location of government facilities, utilities, utility infra-structure, and the like.

The request for data processing of a sensitive geographic region of interest includes information indicative of geographic location of the region of interest. The geographic information may be in the form of latitude and longitude, a postal address, or any geographic information sufficient to pinpoint the location of the region. It should be noted that step 206 may occur before step 202. In other words, the aerial images may be captured subsequent to the request for data processing.

In step 208, the secure server processor 126 may correlate the geographic location of the requested sensitive region of interest with one or more geo-referenced aerial image. The secure server processor 126 may select one or more geo-referenced aerial image that has a geographic location that correlates to the geographic location of the requested sensitive region of interest. Any number of aerial images may be selected that represent the sensitive geographic region of interest in enough detail for data processing of a type requested by the customer 150. For example, only one image may be needed for simple qualitative discernments or counts of items/objects in the image. In another example, multiple images may be needed for three-dimensional measurements. In another example, five geo-referenced aerial images are selected including images with perspectives from four oblique directions (North, South, East, West) and one nadir direction (that is, looking approximately straight down).

In one embodiment, as shown in step 210, the secure server processor 126 may divide the sensitive geographic region of interest into two or more isolated Work Regions and corresponding aerial image(s). The division of the sensitive geographic region of interest may utilize any method and the sensitive geographic region of interest may be divided in any manner. For example, the division may take place utilizing a pre-determined parceling system, such as, for example, a land parcels database which specifies parcels of land in the United States, such that one Work Region is defined as one land parcel. Or, the secure server processor 126 may divide the geographic region of interest by geographic measures, such as square miles or blocks. Or, the secure server processor 126 may divide the geographic region of interest by object delineators, for example, one building, one block, and so on. The division may be based on the amount of data processing to be done for each Work Region. The division may be based on obscuring the geographic location of the region of interest, for instance by dividing recognizable features into different Work Regions. The customer 150 may determine how the geographic region of interest is divided. The correlation step 208 may occur before or after step 210. For instance, the secure server processor 126 may correlate the Work Region geographic location to one or more aerial image depicting the Work Region geographic location.

In step 212, the secure server processor 126 may associate the sensitive geographic region of interest and/or the Work Regions with tracking parameters for tracking data processing of the Work Regions and/or the sensitive geographic region of interest. For example, the tracking parameters may include information indicative of which geo-referenced aerial image(s) are associated with a Work Region and/or sensitive geographic region of interest, which Work Region(s) are associated with which sensitive geographic region of interest, whether the Work Region and/or sensitive geographic region of interest has been processed, whether the Work Region and/or sensitive geographic region of interest has been quality checked, whether the Work Region and/or sensitive geographic region of interest has been assigned to a data processing entity/operator 112/114 and to which data processing entity/operator 112/114, attributes of the data processing entity/operator 112/114 (for example, location, identification information, characteristics, etc.), and so on.

In step 214, the controlled datacenter 110 may receive a request from a data processing entity/operator 112/114 indicative of the entity's/operator's 112/114 availability to process data. The data processing entity/operator 112/114 may be located in a distant location from the controlled datacenter 110 having the geo-referenced aerial images. The data processing entity/operator 112/114 is not required to have security clearance. The data processing entity/operator 112/114 may transmit the request via the network 118, for example.

In response, the secure server processor 126 in the controlled datacenter 110, shown in step 216 in FIG. 2B, may select one or more Work Region or complete sensitive geographic region of interest for the data processing entity/operator 112/114 to process based at least in part upon the tracking parameters. The selection may be based on one or more of a variety of factors, including, but not limited to, the status of the processing of a particular Work Region which may be indicated by the data parameters for the Work Region; random selection of Work Region(s) in a designated sensitive geographic region of interest; the number of Work Regions in the sensitive geographic region of interest which the data processing entity/operator 112/114 has already processed; the data processing entity/operator's geographic location/nationality; or any number of criteria defined for the sensitive geographic region of interest by the customer 150, for example, based on the level of security needed.

For example, if a data processing operator 114 has already processed a first Work Region in a first sensitive geographic region of interest, the secure server processor 126 in the controlled datacenter 110 may select a second Work Region from a second sensitive geographic region of interest outside of the first sensitive geographic region of interest so as to further limit the data processing operator's 114 knowledge of any one sensitive geographic region of interest. In another example, the secure server processor 126 may select for processing Work Regions in the same sensitive geographic region of interest but that are not contiguous to one another. The secure server processor 126 may use the tracking parameters for the Work Regions and/or sensitive geographic region of interest to keep track of what Work Regions a specific data processing operator 114 has processed in the past or is currently assigned.

In step 218, the secure server processor 126 may isolate one or more aerial image that correlates to the geographic location of the requested sensitive region of interest, as previously determined in step 208. In step 220, the secure server processor 126 may remove the information indicative of geographic location of the geographic area depicted in the one or more aerial image, such as the real-world geographic coordinate system. In step 222, secure server processor 126 in the controlled datacenter 110 may transmit the selected one or more aerial image for selected Work Region(s) to the data processing entity/operator 112/114 via the network 118. The one or more aerial image may be isolated such that the data processing entity/operator 112/114 cannot view surrounding images depicting geographic locations surrounding the provided aerial image(s). For example, the data processing entity/operator 112/114 cannot "zoom out" or pan beyond the edges of the provided aerial image(s).

The data processing entity/operator 112/114 may receive the aerial image(s) (step 224) and perform data processing tasks (step 226). As previously described, the data processing may be carried out on one or more user device processor 128 on one or more operator user device 116, such as a computer 130 or a "dumb" device or on a distributed network, for example.

Different types of data processing may require different steps in the method for processing aerial images of sensitive geographic regions of interest. In some instances, data processing may require only a qualitative judgment or a count, for example, counting damaged utility poles. In that case, the data processing operator 114 may simply make the qualitative judgment or count, record the result, mark the Work Region processing as complete, and transmit the result to the controlled datacenter 110. As another example, the data processing may require the data processing operator 114 to select/mark points on the aerial image and/or take measurements on the aerial image, as dictated by the type of processing requested by the customer 150.

The operator user device 116, or other processor in the computer system 100, may record the selected point(s) as image coordinates, such as a pixel row location and pixel column location. The selected point(s) image coordinates may be recorded by the one or more user device processor 128 and stored in non-transient memory. If needed, the data processing operator 114 may also select a measurement mode to indicate that the selected points relate to a measurement and then take relative measurements on the aerial image. The selected points and the measurement mode may be recorded by the user device processor 128 in non-transient memory.

Once the data processing entity/operator 112/114 has completed data processing of the aerial image(s), the selected points and measurement mode data, or other processing data may be transmitted back to the secure server processor 126 in the controlled datacenter 110 via, for example, the network 118, as shown in step 228 of FIG. 2C. Alternatively, the image coordinates of the selected point(s) and/or measurement mode data can be transmitted and recorded directly in the secure server processor 126 in the controlled datacenter 110.

In step 230, the secure server processor 126 in the controlled datacenter 110 may translate the selected image data, such as selected points, and processed data from the image coordinates, such as pixel image row and pixel image column coordinates, to the real-world geographic coordinate system, such as latitude and longitude. The secure server processor 126 may calculate measurements such as length, area, slope, or the like based on the selected points and as requested by the customer 150.

In step 232, the secure server processor 126 may record the calculation(s) and update/record the status of the tracking parameter(s), for example, changing the status to "processed" if the data processing is complete, and/or, for example, storing attribute information of the data processing operator 114 with the real-world geographic coordinates. The real-world geographic coordinates and/or measurements and/or tracking parameters may be stored in non-transient memory, for example, a non-transient computer readable medium. If data processing is complete for the sensitive geographic region of interest, the one or more secure server processors 126 may transmit results of the data processing to the customer 150.

Figure 3B:
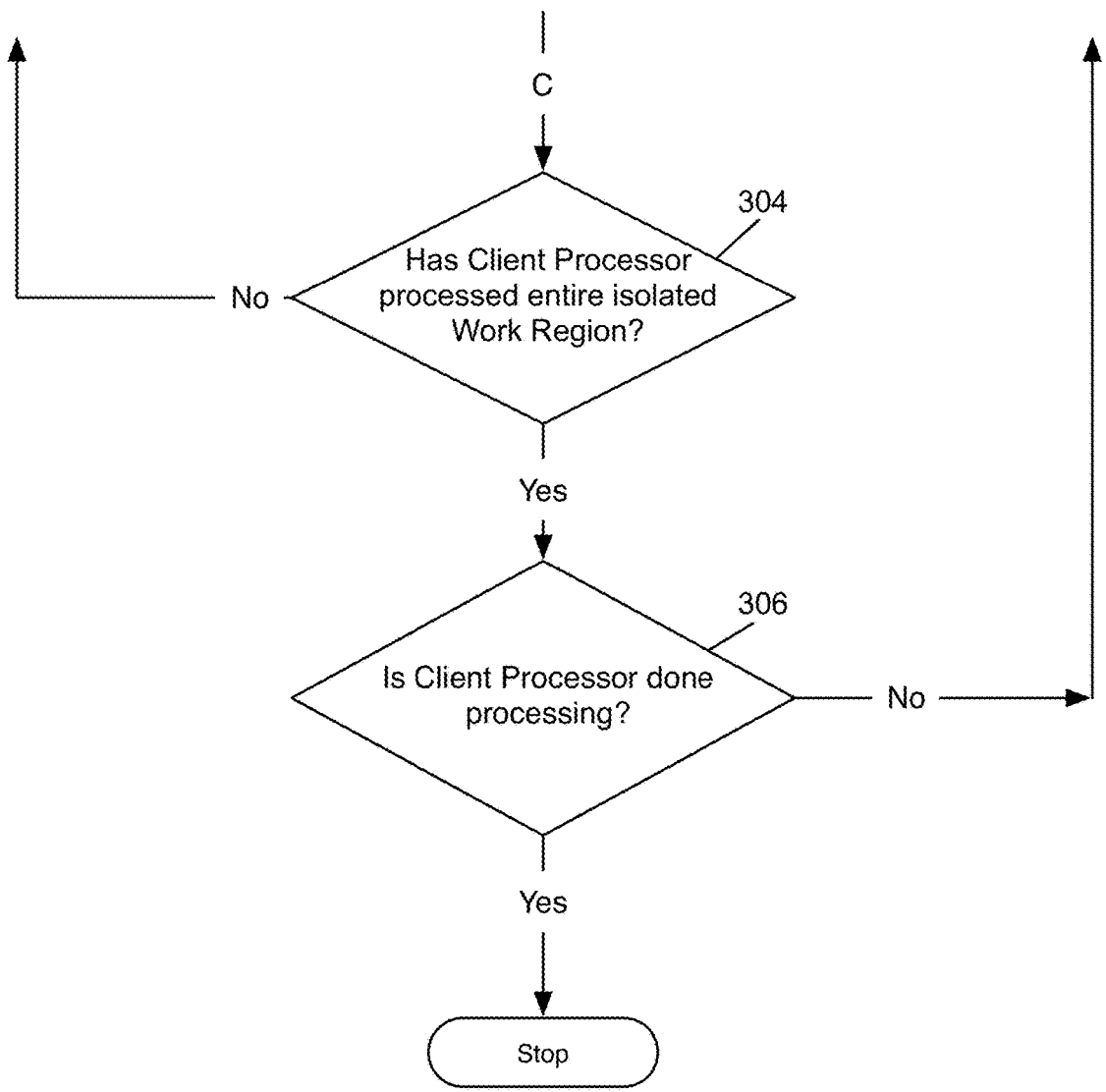

In some instances, the data processing entity/operator 112/114 will require multiple aerial images of the same geographic location to complete data processing, for example, when a three-dimensional measurement is needed. For example, FIGS. 3A-3B depict a process flow diagram of steps of an exemplary method 300 for data processing of a sensitive geographic region of interest in accordance with the present disclosure. FIGS. 4A-4D depict the sub-steps of data processing of step 400 of FIG. 3A.

In step 302 of FIG. 3A, software may be initiated on the operator user device 116 of the data processing operator 114. In step 214a, the data processing operator 114 may interact with the software via the network 118, such as the internet, to request from the controlled datacenter 110 a region of work to be processed. In step 216*a*, the secure server processor 126 may select a Work Region for the data processing operator 114 based on one or more parameters. The one or more parameters may include, but are not limited to, one or more of the status of the processing of the Work Region, a random selection of a Work Region in the sensitive geographic region of interest, and/or one or more predetermined criterion such as data processing operator 114 location, group, status, number of Work Regions in the sensitive geographic region of interest the data processing operator 114 has already processed, and/or any number of criteria pre-defined for the sensitive geographic region of interest.

In step 222*a* in FIG. 3A, the secure server processor 126 may send the data processing operator's 114 user device processor 128 (also known as the Client Processor) isolated aerial images of a selected Work Region. The isolated aerial images may be stripped of geo-reference data, as previously described. The aerial images may be transmitted without real-world coordinate data and without measurement data. Then, in step 400, which will be further described in conjunction with FIGS. 4A-4D, the data processing operator 114 performs the required aerial image data processing.

Now referring to FIG. 3B, after performing aerial image data processing, if the processing operator 114 has processed the entire isolated Work Region (decision step 304), and has completed processing for the session (decision step 306), then the process is complete and the software session may be ended. If the data processing operator 114 has not processed the entire isolated Work Region, the process returns to repeat step 400. If the data processing operator 114 has not completed processing for the session, then the process returns to step 214*a* to repeat the process of FIGS. 3A-3B.

FIGS. 4A-4D depict an exemplary process flow chart of step 400 of FIG. 3A. As previously described, continuing from FIG. 3A, in step 222*a* the secure server processor 126 may send the data processing operator's 114 user device processor 128 (also known as the Client Processor) isolated aerial images of a selected Work Region. The isolated aerial images may be stripped of geo-reference data, as previously described. In step 402 of FIG. 4A, the user device processor 128 may receive the aerial image(s) needed for processing the selected isolated Work Region.

Figure 4A:
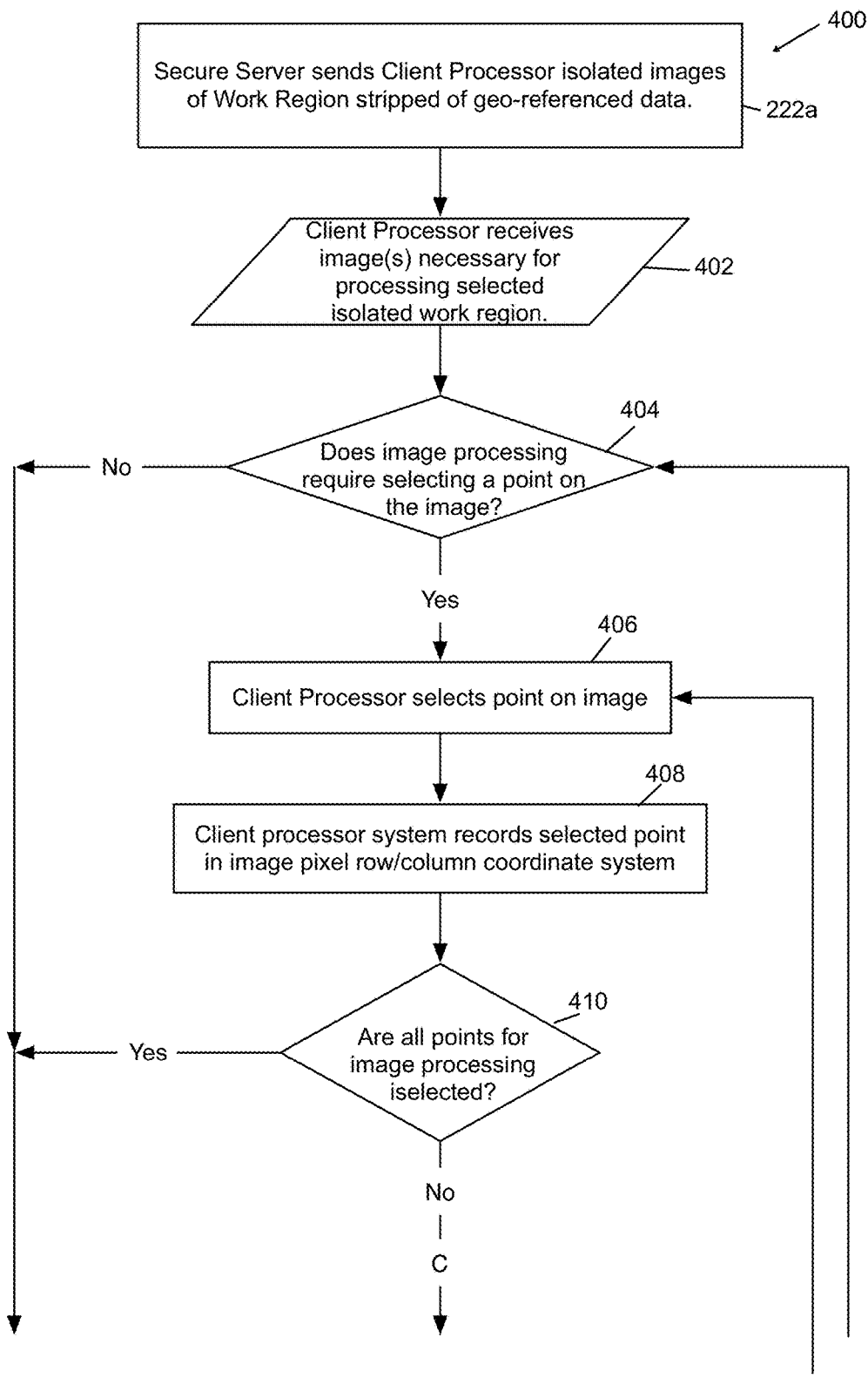
FIGS. 4A-4D show a process flow diagram of steps of an exemplary method for data processing of a sensitive geographic region of interest involving multiple images in accordance with the present disclosure.
Figure 4B:
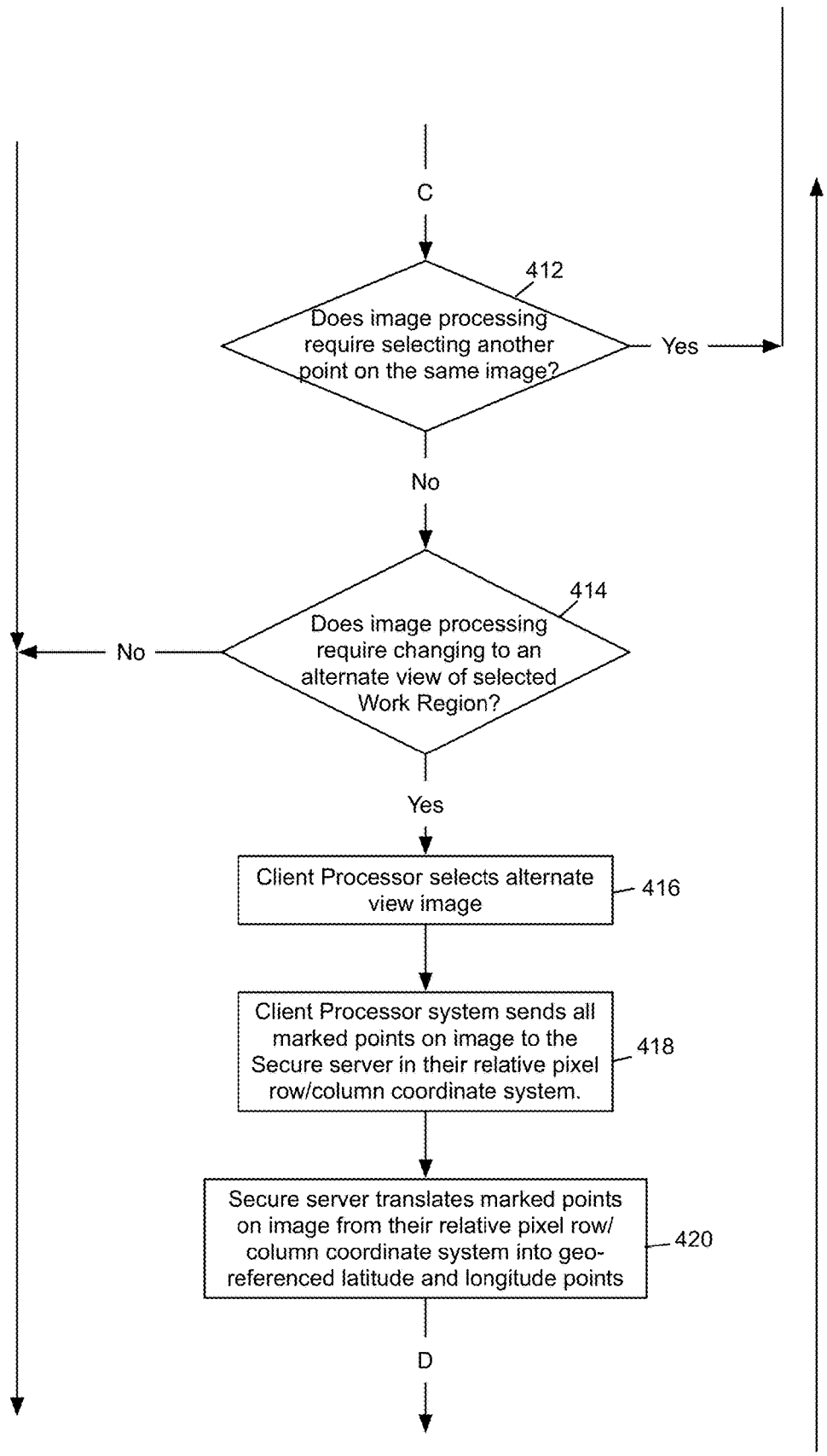
Figure 4C:
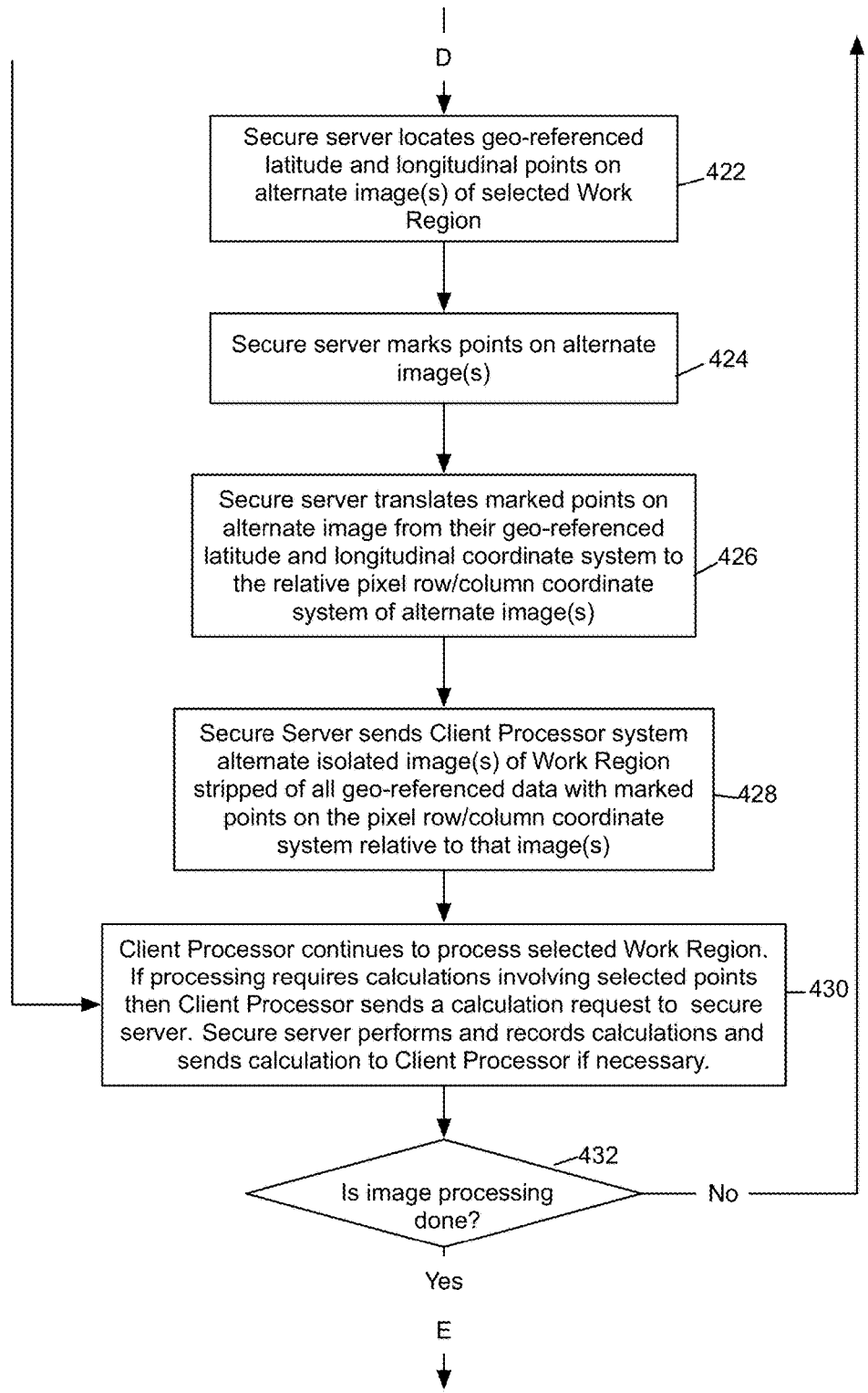

In decision step 404, if the image processing does not require selecting a point on the aerial image, then the process moves to step 430, which will be further described in conjunction with FIG. 4C. Alternatively, if the image processing requires selecting a point on a first aerial image, then in step 406, the data processing operator 114 through the user device processor 128 (Client Processor) may select a point on the first aerial image. In step 408, the user device processor 128 (Client Processor) may record the selected point using the image coordinates, such as the point's pixel row and column location coordinates, in the first aerial image. If the image processing involves a measurement, then a selection mechanism, such as logic initiated with a button or field may be presented to the data processing operator 114 followed by selection of the point(s) to effect the measurement.

In decision step 410, if all points for image processing have been selected, then the process moves to step 430, which will be further described in conjunction with FIG. 4C. Alternatively, if all points for image processing have not been selected, then the process proceeds to decision step 412 in FIG. 4B. If the image processing requires selecting another point on the same image (step 412), then the process returns to step 406 to select another point. Once all the required points are selected, then the process continues to decision step 414. If the image processing does not require changing to an alternate view of the selected Work Region (step 414), then the process moves to step 430, which will be further described in conjunction with FIG. 4C. If the image processing requires changing to an alternate view of the selected Work Region (step 414), then the user device processor 128 (Client Processor) may select a second isolated aerial image having an alternate view of the selected Work Region, in step 416. In step 418, the data processing entity/operator 112/114 may also send the selected point(s)'s image coordinates, such as pixel row and column location coordinates, on the first aerial image to the secure server processor 126.

In step 420, the secure server processor 126 in the controlled datacenter 110 translates the selected point(s) on the first aerial image from image coordinates, such as the pixel row and column location coordinates, to real-world geographic coordinates, such as latitude and longitude.

Then, in step 422 in FIG. 4C, the secure server processor 126 may locate the real-world geographic coordinates on the second aerial image corresponding to the real-world geographic coordinates of the selected points on the first aerial image. In step 424, the secure server processor 126 may mark the selected points and/or measurements on the second aerial image based on the corresponding real-world geographic coordinates. In step 426, the secure server processor 126 may translate the marked points on the second aerial image from real-world geographic coordinates to relative image coordinates, such as image pixel row and column coordinates, on the second aerial image.

In step 428, the secure server processor 126 may transmit the second isolated aerial image with the translated selected points and/or measurements to the data processing entity/operator 112/114 user device processor 128 (Client Processor). The real-world geographic information is not transmitted to the user device processor 128 to prevent the data processing operator 114 from learning the real-world location of the second isolated aerial image.

In step 430, the data processing operator 114 may continue to process the selected Work Region. If processing the selected Work Region requires calculations involving selected points, then the user device processor 128 (Client Processor) may send a calculation request to the secure server processor 126. The secure server processor 126 may perform and record calculations and send calculation results to the user device processor 128 (Client Processor) as necessary. When it is desired to maintain the measurements are calculations confidential, the secure server processor 126 preferably will not send the calculation results to the user device processor 128.

In decision step 432, if the image processing is not complete, the process may return to step 404 for additional processing. As indicated in decision step 432, the process may be repeated, with as many alternate aerial images as needed to complete the measurements/data processing request.

Figure 4D:
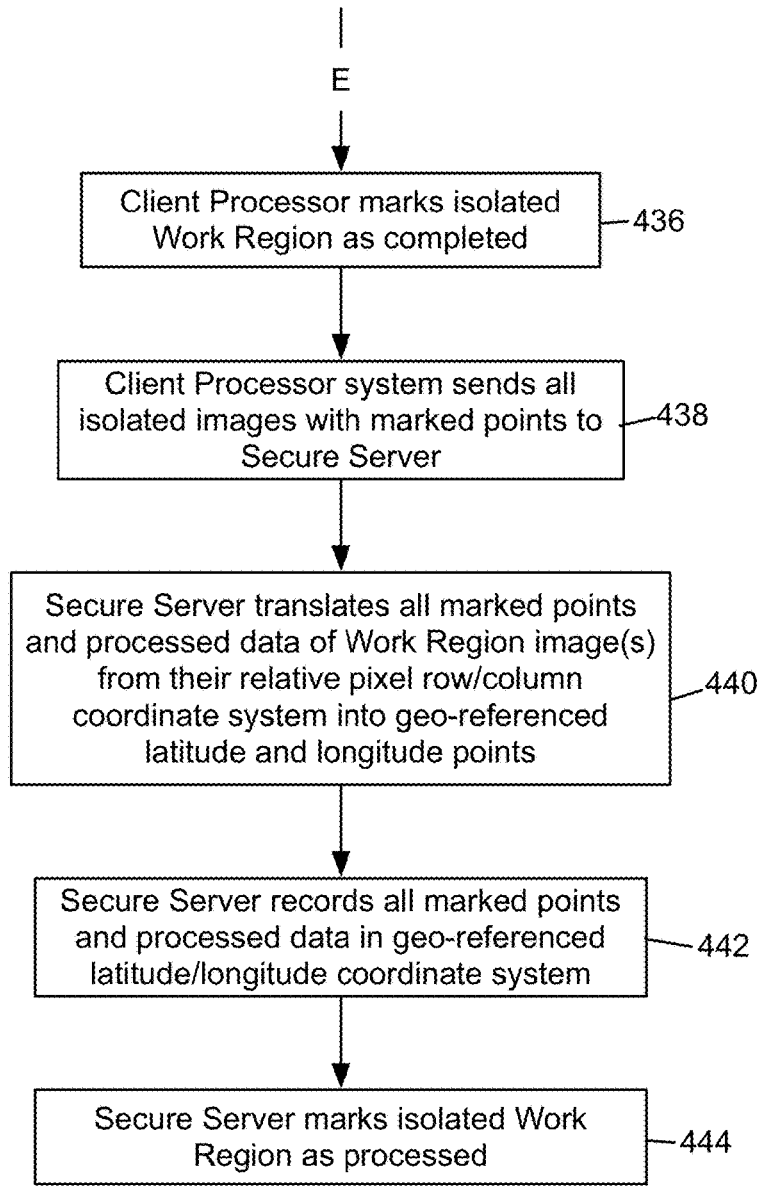

If the image processing is complete, then the process may continue to step 436 depicted in FIG. 4D. In step 436, the user device processor 128 (Client Processor) may mark the isolated Work Region as completed for data processing. In step 438, the user device processor 128 (Client Processor) may send the aerial image(s) with selected/marked points to the secure server processor 126. In step 440, the secure server processor 126 in the controlled datacenter 110 may translate the selected/marked points on the aerial image(s)

and the processed data from the relative image coordinates, such as image pixel row and column coordinates, into the real-world geographic coordinate system, such as latitude, longitude and elevation above sea level.

In step 442, the secure server processor 126 may record the marked points and processed data in the real-world geographic coordinate system in non-transitory memory, such as a non-transitory computer readable medium. The secure server processor 126 may mark the isolated Work Region as processed, as in step 444. The secure server processor 126 may update the Work Region and/or sensitive geographic region of interest parameters with the status of the data processing. If data processing is complete for the sensitive geographic region of interest, the secure server processors 126 may transmit results of the data processing to the customer 150.

Figure 5:
FIG. 5 is an exemplary screen shot of an exemplary system in accordance with the present disclosure on a display on an operator user device.

In one example of the process, the data processing operator 114 may start with a nadir view image, select points, take measurements, and then may choose an oblique view so as to take three dimensional measurements. FIG. 5 is an example of a screen shot 500 of an exemplary system in accordance with the present disclosure on the display 132 on the operator user device 116. In this example, an aerial image 502, without geo-referenced information, from a nadir view is displayed to the data processing operator 114. The displayed image may be through browser 138, for example. The data processing operator 114 may be asked to process specific data for the Work Region. Here, the data processing operator 114 is asked to outline property parcels in the provided aerial image 502 and to make discernments regarding the property structures on the parcels, such as number of stories and garage type, for example. The data processing operator 114 is provided with aerial images from alternate views of the property such that the data processing operator 114 may choose an alternate aerial image, as previously described in conjunction with FIGS. 4A-4D.

In this example, the data processing operator 114 is provided with one nadir view aerial image 502 and four oblique views 504, 506, 508, and 510. Each aerial image 502-510 may be isolated such that the data processing operator 114 is not able to pan or zoom beyond the edge of each image 502-510 and such that the data processing operator does not have access to real-world geographic information. In the screen shot 500, the edge is shown as the black region 512 along the side of the image 502. In one example, the secure server processor 126 may reduce the pixel resolution of the aerial images 502-510 so as to be fully displayable on the display 132, such as a computer monitor, with a minimum resolution of 480 by 640. The data processing operator 114 may only be able to see images assigned to the data processing operator 114 for data processing of the one or more Work Regions.

In one embodiment, the data processing operator 114 is allowed to pan between aerial images within the assigned Work Region, for example, when multiple images showing a corridor are needed for data processing, such as counting utility poles. However, the amount of panning allowed may still be limited to only the images designated for the assigned Work Region. Techniques for panning within aerial images are disclosed in a patent application identified by U.S. Ser. No. 12/023,861, filed on Jan. 31, 2008.

The data input area 514 in FIG. 5 is shown by way of example and may contain any number of fields for the data processing operator 114 to input data, as needed by the type of data processing requested by the customer 150.

Figure 6:
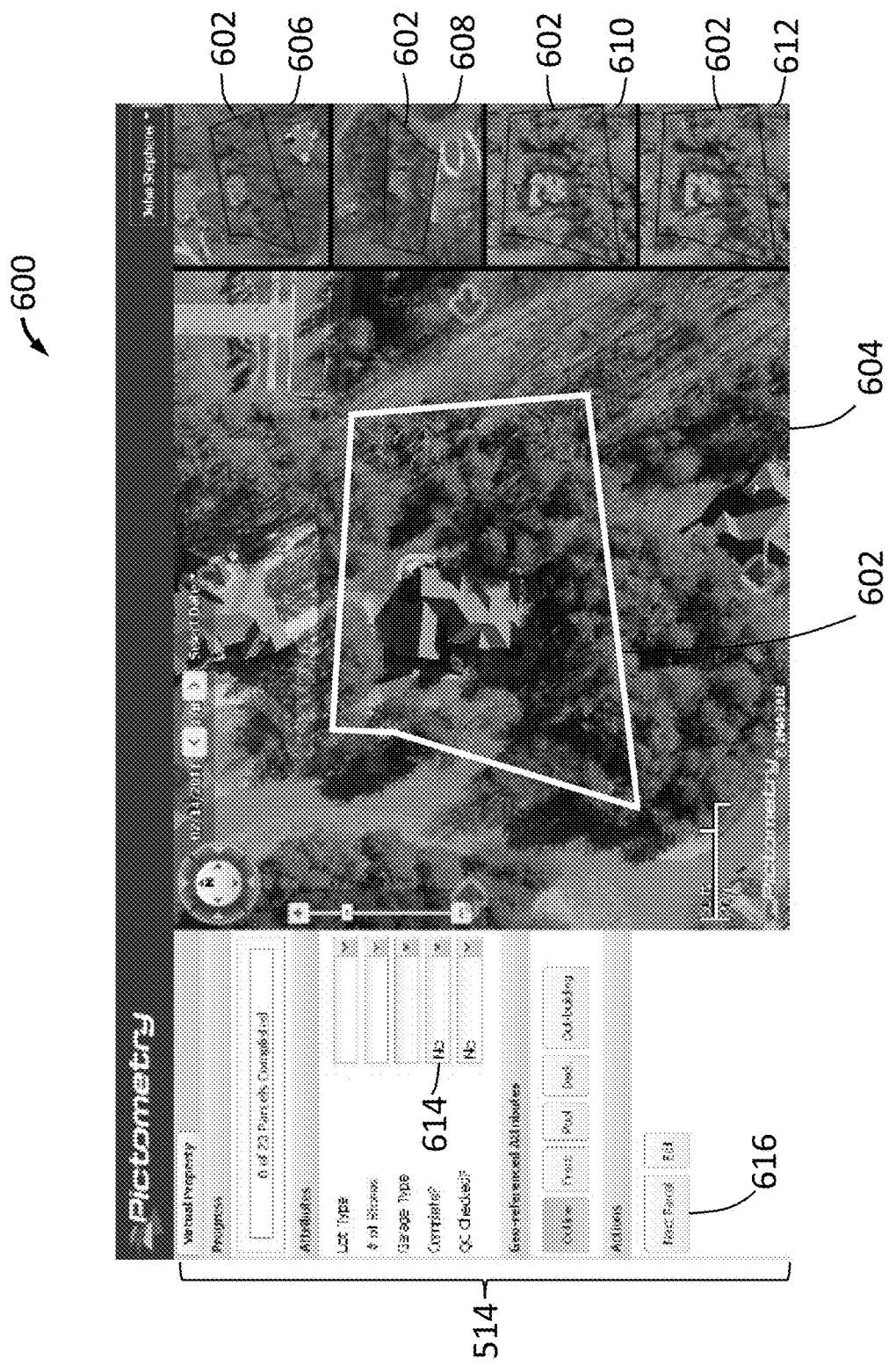
FIG. 6 is another exemplary screen shot of an exemplary system in accordance with the present disclosure on a display on the operator user device.

FIG. 6 is another example of a screen shot 600 of an exemplary system in accordance with the present disclosure on the display 132 on the operator user device 116. Similar to the example shown in FIG. 5, here the data processing operator 114 has outlined a property parcel 602 in a first image 604 based on selecting an outline tool followed by four points in the image, the points identified with the image coordinates, such as image pixel row and column location. The user device processor 128 (Client Processor) has transmitted the selected points of the outline with image coordinate data to the secure server processor 126 in the controlled datacenter 110. The secure server processor 126 has translated the marked outline points from the image coordinates to the real-world coordinate system and then transposed the marked outline of the property parcel 602 to alternate view aerial images 606, 608, 610, and 612. The secure server processor 126 has translated the alternate view aerial images' 606-612 real-world coordinate systems to relative image coordinates, such as image pixel row and column coordinates, and transmitted all of the images 604-612 back to the data processing operator 114 with the marked outlines of the property parcel 602 for more processing, as previously described in conjunction with FIGS. 4A-4D.

Once the data processing is complete, the data processing operator 114 may change the "Complete" box 614 in the data input area 514 to indicate completion and transmit the aerial images and processed data back to the controlled datacenter 110. Actions by the data processing operator 114, such as marking the "Complete" box 614 may change the tracking parameters associated with the image(s), Work Region(s), and/or sensitive geographic region of interest. And/or the secure server processor 126 in the controlled datacenter 110, after receipt of the data, may change the tracking parameters associated with the image(s), Work Region(s), and/or sensitive geographic region of interest. In one example, the data input area 514 contains an input area 616 for the operator to request another parcel within a Work Region for processing, as shown in FIG. 6, to request the next land parcel to outline.

In one embodiment, an "abstraction" layer may be used on top of a geospatial engine between the engine and the data processing operator 114. The abstraction layer is logic meant to restrict geographic information from certain data processing operators of aerial imagery such that real-world geographic coordinates are not shown or known by the data processing operators. One method for accomplishing this is to embed aerial image display window(s) into a new framework without embedding location output window(s). As such, even though the underlying geospatial engine system may automatically return the geographic location when a point on the image is selected, the geographic location is not displayed to the data processing operator 114 and is not available to the data processing operator 114. In one example, a limited number of measurement tools are available to the data processing operator 114, that is, the measurement tools that uses relative measurement, such as distance, height, area, and/or volume. The output of the measurement tools may be filtered to restrict any geographic information such that only relative measurements are displayed to the data processing operator 114.

Additionally, the abstraction layer may intercept commands from the data processing operator 114 to scroll, pan, or zoom to images beyond the assigned image(s). This prevents the data processing operator 114 from using additional images to try to determine geographic location and reduces the risk of data processing operator 114 being able to duplicate the database. If the aerial images are part of a mosaic image, the "scale factor" may be locked down to a maximum scale, or the abstraction layer can intercept zoom commands to prevent the operator from viewing images beyond the assigned Work Region.

Figure 7:
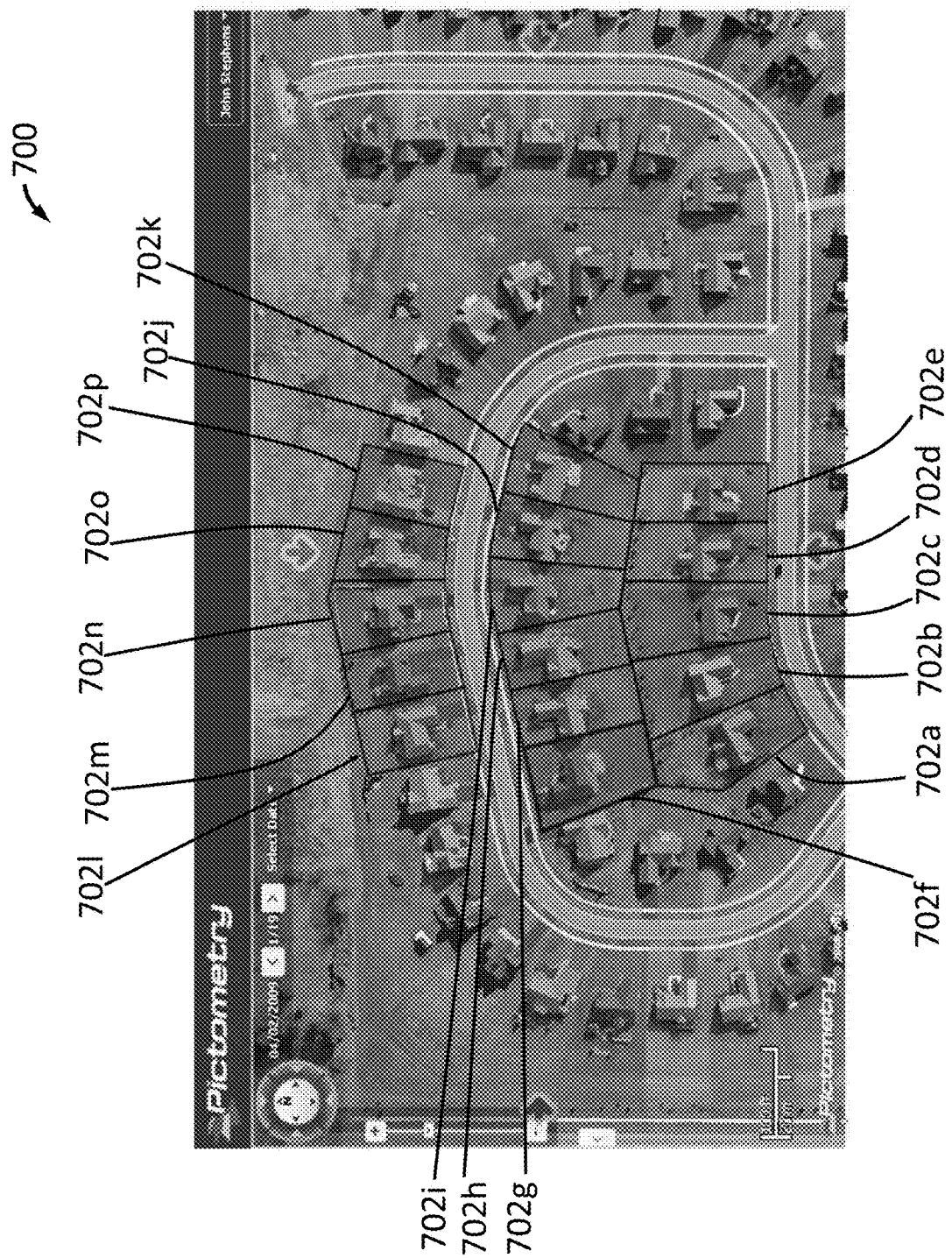
FIG. 7 is an exemplary screen shot of an exemplary system in accordance with the present disclosure on a display.

In one embodiment, the secure server processor 126 may divide the sensitive geographic region of interest into two or more isolated Work Regions and corresponding aerial image(s) such that one Work Region is defined as one land parcel 702. FIG. 7 depicts an exemplary screenshot 700 of a display illustrating an example of the division of an exemplary sensitive geographic region of interest into Work Regions based on land parcels 702. In this example, land parcel 702a corresponds to a first Work Region, land parcel 702b corresponds to a second Work Region, land parcel 702c corresponds to a third Work Region, and so on. In this example, sixteen Work Regions have been defined corresponding to land parcels 702a-702p. Of course, it should be understood that any number of land parcels 702 may be used to define corresponding Work Regions.

One or more individual Work Region may be assigned to a non-secure data processing entity/operator 112/114. For example, the Work Region corresponding to land parcel 702f may be assigned by the secure server processor 126 to a specific data processing operator 114. When the data processing operator 114 has completed data processing on the Work Region, the secure server processor 126 may assign one or more other Work Regions to the data processing operator 114 for processing. For example, the secure server processor 126 may assign a Work Region corresponding to a land parcel 702d, which is non-contiguous to the Work Region corresponding to land parcel 102f already processed. In this way, the geographic information of the sensitive geographic region of interest is further hidden from the data processing operator 114.

CONCLUSION

Conventionally, data processing of aerial imagery depicting sensitive geographic regions is restricted to persons with high-level security clearance because of the secretive nature of the geographic location of the regions. In accordance with the present disclosure, sensitive aerial imagery depicting sensitive geographic regions can be processed by operators not having security clearance by restricting the geographic information presented in the aerial imagery. Specifically, by removing real-world geographic coordinate systems in aerial imagery, transmitting the aerial imagery for data processing, receiving the images and data after the images are processed using image coordinates such as image pixel row and column coordinates, and translating the pixel row and column information into real-world geographic coordinates for further analysis.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

It should be understood that not all of the steps described are necessary or necessarily in the order described and that one or more of the steps may be executed on different portions of the computer system 100.

What is claimed is:

1. A method comprising the steps of:
receiving, by a processor of a server computer, a request from a requester for data processing of a sensitive geographic region of interest, said region being identified by one or more geographic locations;
selecting one or more geo-referenced aerial images such that at least a portion of the sensitive geographic region of interest is depicted in the geo-referenced aerial images;
transmitting, by the processor of the server computer, image raster content of the one or more geo-referenced aerial images to an operator user device without the location represented by the geo-referenced aerial image being selected by a data processing operator of the operator user device, wherein the operator is different from the requester, and without transmitting geo-referencing information of the geo-referenced aerial image and without transmitting real-world geographic coordinates of the geo-referenced aerial image and restricting the real-world geographic coordinates from being displayed on the operator user device;
receiving, by the processor of the server computer from the operator user device, at least one image coordinate representing an object or region of interest selected within the geo-referenced aerial image by the data processing operator of the operator user device, wherein the image coordinate is a relative coordinate based on a unique pixel location within the image raster content of the geo-referenced aerial image, the pixel location having pixel row and pixel column coordinates; and
translating, by the processor of the server computer, the image coordinate into real-world geographic coordinates representing the object or region of interest selected within the geo-referenced aerial image by the data processing operator of the operator user device, using the geo-referencing information of the geo-referenced aerial image.

2. The method of claim 1, further comprising the step of:
storing, on a non-transitory computer readable medium, the real-world geographic coordinates representing the object or region of interest selected within the geo-referenced aerial image by the data processing operator of the operator user device.

3. The method of claim 2 wherein data indicative of attributes of the data processing operator is stored with the real-world geographic coordinates.

4. The method of claim 2 wherein storing, on the non-transitory computer readable medium, the real-world geographic coordinates representing the object or region of interest selected within the geo-referenced aerial image by the data processing operator of the operator user device, includes storing a series of related points that form a path or a polygon.

5. The method of claim 1, wherein at least two image coordinates are received and translated into real-world coordinates, and further comprising the steps of:

calculating, by the processor of the server computer, a measurement based on the real-world geographic coordinates; and storing the measurement on a non-transitory computer readable medium.

6. The method of claim 5, wherein the measurement is not transmitted to the operator user device.

7. The method of claim 5, wherein the measurement is at least one of distance, height, slope in elevation, area, and surface area of a vertical or pitched surface.

8. The method of claim 5, wherein data indicative of attributes of the data processing operator is stored with the measurement.

9. The method of claim 1, wherein the transmitted aerial image has a pixel resolution so as to be fully displayable on a computer monitor without panning, the pixel resolution having a minimum resolution of 480 by 640.

10. The method of claim 1, wherein the geo-referenced aerial image is a first geo-referenced aerial image and wherein upon receiving an indication from the operator user device that processing is completed for the first geo-referenced aerial image, the processor of the server computer transmits a second geo-referenced aerial image to the operator user device.

11. The method of claim 1, wherein the at least one image coordinate are first image coordinates and the geo-referenced aerial image is a first geo-referenced aerial image, the method further comprising:

retrieving a second geo-referenced aerial image having image raster content and second geo-referencing information, the second geo-referencing information indicative of real-world geographic coordinates of pixels in the image raster content of the second geo-referenced aerial image;

determining the real-world geographic coordinates representing the object or region of interest from the first geo-referenced aerial image in the second geo-referenced aerial image;

converting the real-world geographic coordinates representing the object or region of interest into second image coordinates relative to the second geo-referenced aerial image based on a unique pixel location within the image raster content of the second geo-referenced aerial image, the pixel location having pixel row and pixel column coordinates;

causing a marker to appear on the second geo-referenced aerial image coinciding with the second image coordinates; and transmitting the second geo-referenced aerial image with the marker to the operator user device without transmitting the second geo-referencing information and without transmitting the real-world geographic coordinates, thus never sending the real-world geographic coordinates to the operator user device.

12. The method of claim 1, further comprising the step of:

dividing the sensitive geographic region of interest and the selected images into two or more isolated work regions.

13. A system, comprising:

a secure server computer having a processor; and one or more geo-referenced aerial image accessible by the processor of the server computer, the geo-referenced aerial images containing image raster content depicting an area, geo-referencing information, and real-world geographic coordinates of the geo-referenced aerial image; and wherein the processor of the server computer executes computer executable instructions to cause the processor to:

receive a request from a requester for data processing of a sensitive geographic region of interest, said region being identified by one or more geographic locations;

select one or more geo-referenced aerial images such that at least a portion of the sensitive geographic region of interest is depicted in the geo-referenced aerial images;

transmit raster image content of the one or more geo-referenced aerial images to an operator user device without the location represented by the geo-referenced aerial image being selected by a data processing operator of the operator user device, wherein the operator is different from the requester, and without the geo-referencing information and without the real-world geographic coordinates, and restrict the real-world geographic coordinates from being displayed on the operator user device;

receive, from the operator user device, at least one image coordinate representing an object or region of interest selected within the image raster content of the geo-referenced aerial image by the data processing operator of the operator user device, wherein the image coordinate is a relative coordinate based on a unique pixel location within the image raster content of the geo-referenced aerial image, the pixel location having pixel row and pixel column coordinates; and translate the image coordinate into real-world geographic coordinates representing the object or region of interest selected within the geo-referenced aerial image by the data processing operator of the operator user device.

14. The system of claim 13, wherein the processor of the server computer executes computer executable instructions to cause the processor to store, on a non-transitory computer readable medium, the real-world geographic coordinates representing the object or region of interest selected within the geo-referenced aerial image by the data processing operator of the operator user device.

15. The system of claim 14 wherein the processor of the server computer executes computer executable instructions to cause the processor to store, on a non-transitory computer readable medium, data indicative of attributes of the data processing operator with the real-world geographic coordinates.

16. The system of claim 14 wherein storing, on the non-transitory computer readable medium, the real-world geographic coordinates representing the object or region of interest selected within the geo-referenced aerial image by the data processing operator of the operator user device, includes storing a series of related points that form a path or a polygon.

17. The system of claim 13, wherein the processor of the secure server computer calculates a measurement based on the real-world geographic coordinates and stores the measurement on a non-transitory computer readable medium.

18. The system of claim 17, wherein the measurement is not transmitted to the operator user device.

19. The system of claim 17, wherein the measurement is at least one of distance, height, slope in elevation, area, and surface area of a vertical or pitched surface.

20. The system of claim 17, wherein data indicative of attributes of the data processing operator is stored with the measurement.

21. The system of claim 13, wherein the transmitted aerial image has a pixel resolution so as to be fully displayable on a computer monitor without panning, the pixel resolution having a minimum resolution of 480 by 640.

22. The system of claim 13, wherein the geo-referenced aerial image is a first geo-referenced aerial image and wherein upon receiving an indication from the operator user device that processing is completed for the first geo-referenced aerial image, the processor of the server computer transmits an image raster content of a second geo-referenced aerial image to the operator user device.

23. The system of claim 13, wherein the at least one image coordinate are first image coordinates and the geo-referenced aerial image is a first geo-referenced aerial image, wherein upon receipt of the image coordinates and translation into real-world geographic coordinates, the processor of the server computer retrieves a second geo-referenced aerial image having geo-referencing information and converts the real-world geographic coordinates representing the object or region of interest of the first geo-referenced aerial image into second image coordinates relative to the second geo-referenced aerial image, causes a marker to appear on the second geo-referenced aerial image coinciding with the second image coordinates, and transmits image raster content of the second geo-referenced aerial image with the marker to the operator user device without transmitting the geo-referencing information and without transmitting the real-world geographic coordinates, thus never sending real-world geographic coordinates to the operator user device.

24. The system of claim 13, wherein the processor of the server computer executes computer executable instructions to cause the processor to divide the sensitive geographic region of interest and the selected images into two or more isolated work regions.

* * * * *